April 25, 1961     E. C. BROWNE ET AL     2,981,693
APPARATUS AND METHOD OF CONTROLLING FOAM
Filed Jan. 17, 1958

INVENTOR.
EDWIN C. BROWNE
CHARLES R. SOFIELD
BY
*Harvey W. Edelblute*
ATTORNEY

…… …

2,981,693

APPARATUS AND METHOD OF CONTROLLING FOAM

Edwin C. Browne, Waldwick, N.J., and Charles R. Sofield, Pearl River, N.Y., assignors to American Cyanamid Company, New York, N.Y., a corporation of Maine Filed Jan. 17, 1958, Ser. No. 709,536

4 Claims. (Cl. 252—321)

This invention relates to a method and apparatus for controlling the rise of foam over foam-producing liquids.

In many industrial operations, liquids are employed which develop undesirable foam. The production of antibiotics, vitamins, and chemicals by aerobic fermentation of an aqueous medium are important examples of situations in which real foaming problems are encountered. Control of the rise of foam above the liquid is important in these and other manufacturing processes to prevent loss of valuable product which results from sudden rapid violent foaming. Control of the foam also makes it possible to fill the tanks more nearly full of the liquid being processed and sometimes enables the operation to take place at a faster rate.

Many methods of controlling the rise of foam have been devised. The addition of chemical defoaming agents to the foaming liquid is common practice. These chemical agents are usually added from time to time as necessary in response to a foam alarm system which warns the operator of the development of excess amounts of foam. These chemical defoaming agents have been applied on the surface of the foam, into the liquid medium and into a submerged gas stream directly from conventional defoaming agent outlets. Deforming agents are expensive and oftentimes toxic to the fermentation being conducted in the liquid or act as impurities in the final product making the purification process more expensive. It is desirable, therefore, to use as little of the defoaming agent as is necessary and then only when necessary. One of the principal objects of the present invention is to provide apparatus whereby a minimum amount of antifoaming agent may be applied to a foaming liquid in a processing vessel for the control of foam. The apparatus may be used manually or can be arranged so that it is completely automatic, as will be seen from the following description.

Figure 1:
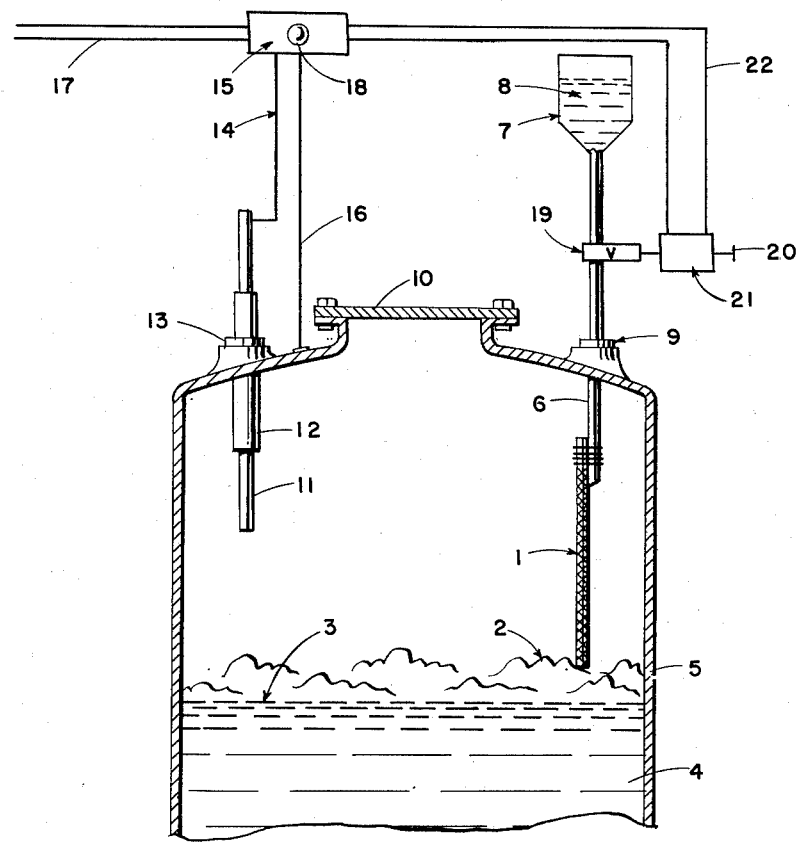
Figure 2:
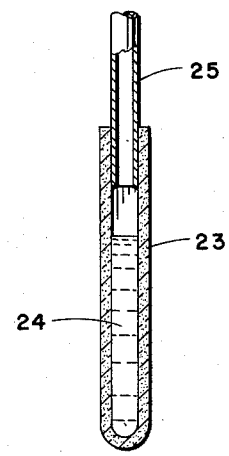

In order that the nature of the invention may be more easily understood, reference is made to the accompanying drawing in which in Figure 1 is shown a vertical section with parts cut away of the apparatus of the present invention and Figure 2 is a cross-sectional elevation of an alternative form of the foam applicator 1 and supply means 6 of Figure 1.

The manner in which the apparatus is used is essentially as follows. The apparatus of the invention in its simplest form comprises an antifoam applicator 1, which is constructed of a material adapted to hold a quantity of antifoaming agent in contact with foam 2 which may rise from the surface of liquid 4 contained in a vessel 5. The foam applicator is constructed of any porous material which will absorb and hold in its interstices the chemical defoaming agent. In many industrial processes, contents of the vessel may be sterilized prior to the operation and/or may be heated during the process; and for this reason, the material of which the foam applicator is made should be heat resistant. A fibrous wick-like structure made of cotton fibers is particularly suitable in many installations. A porous heat-resistant foam applicator of woven stainless steel wire or mineral fibers such as asbestos or glass wool may also be used if desired. It may be in the form of a simple wick as is shown in Figure 1 of the drawing; or as in Figure 2 it may be in the form of a hollow tube 23 made of sintered glass or of a porous ceramic material adapted to hold an adequate volume of the antifoam liquid 24 which may be introduced through pipe 25.

Attached to the antifoam applicator in any suitable manner is a means for bringing antifoam agent to the applicator as required. This may take the foam of a simple tube 6 extending from a reservoir 7 adapted to hold a quantity of antifoaming agent 8. As shown in the drawing, the supply tube extends through a bushing 9 through the tank 5 making a tight fitting capable of supporting the apparatus and of keeping bacteria and other contaminating agents out. Although ordinarily the processing tank would be totally enclosed and would have a manhole cover 10 for cleaning purposes as is shown and a suitable venting arrangement (not shown), the apparatus is not restricted to use with closed vessels. Any suitable means of supporting the antifoam applicator in a position over the level of the liquid in the processing tank may be used.

In its simplest form the apparatus of the invention operates in the following manner:

The porous antifoam applicator 1 is saturated with a quantity of an antifoaming agent. As the process in the vessel 5 gets under way, foam 2 may rise from the surface 3 of the liquid 4. As the surface of the foam touches the lower extremity of the antifoam applicator, a quantity of antifoaming agent will be leached out onto the layer of foam and foaming in the vessel will be reduced to some extent, depending upon a number of factors including the nature of the foam, the antifoaming agent and the amount of it which was distributed into the foam as a result of contact with the applicator. After a period of time, the effectiveness of the antifoaming agent will be dissipated and foam may rise again to make contact with the applicator and will again be controlled as before. Eventually the antifoaming agent in the lower segments of the applicator may become leached out into the foam; and, accordingly, the foam will rise higher up the wick before subsiding. When eventually the level of the foam rises to near the top of the antifoam applicator, it becomes necessary to replenish the supply of antifoaming agent either by hand or by an automatic or semi-automatic arrangement.

In operations where many tanks are used and particularly where they are closed, foam alarms may be installed to warn the operator when the level of foam in the vessel has reached undesirable levels. One simple and conventional foam alarm is shown in Figure 1 of the drawing. This device comprises a metal rod 11 passing through a tube of an insulating material 12 made of a non-conductor of electricity both passing through a suitable supporting bushing 13 on the vessel. The metal rod which is a conductor of electricity is connected electrically in any suitable manner 14 to an alarm box 15 which is in turn connected electrically 16 to the metal vessel. In the event that the vessel is made of a non-electrical conducting material, some other means of connecting the alarm box to the liquid is provided. The alarm box 15 may be connected suitably with a source of electric current 17 and have a bell or light 18 to serve as an audible or visual warning that the foam has reached the warning electrode 11 as indicated by electric current passing through foam between the metal tank and the electrode and thus actuating the alarm. The operator of the process may in response to the alarm manually introduce additional antifoaming chemical.

Additional antifoaming liquid may be applied to the foam applicator 1 from reservoir 7 through valve 19 which can be arranged to be hand operated by means of a suitable control 20 or by a solenoid 21 electrically connected 22 to alarm box 15.

Although one antifoam applicator will be generally sufficient to control foam in small tanks, the installation of two or more may be desirable in tanks having a larger surface of foam to control.

The lower end of the foam applicator should be positioned a short distance over the normal liquid level of the contents of the tank, the exact distance not being critical but rather a matter of choice depending upon the nature of the operation being conducted in the tank and the height at which the foam may be permitted to rise without causing trouble. Similarly, the lower end of the electrode should be positioned higher above the liquid level than is the lower end of the foam applicator. It should, however, be lower than the point at which antifoaming agent is applied to the antifoam applicator to insure time to permit the introduction of fresh antifoaming agent to the applicator upon response to the alarm when the antifoaming agent has been leached from the applicator.

As will be apparent, the foam-controlling apparatus of the present invention is applicable to a wide range of situations in which foaming occurs. It is particularly useful in connection with fermentation processes in which antibiotics such as penicillin and tetracycline are produced during which process the entry of contaminating bacteria and fungi from sources outside the fermentation vessel must be prevented. Application of antifoaming agents to these fermentations, which are characterized by blowing sterile air through the aqueous liquid, is particularly effective by means of the apparatus of the present invention since there is little likelihood of contamination by introduction of antifoaming agent into the tank. As will also be seen, the apparatus makes it possible to use a minimum of antifoaming agent and only as is required for the control of predetermined foam levels in the fermentation vessel.

To illustrate the advantages of the invention, in one aerobic Nocardia sp. fermentation which was conducted in a 30-liter tank for a period of 88 hours, it was necessary to add 14.2 milliliters of a defoaming agent forty-three times by manual addition to control foaming of the fermenting liquid, whereas when using the apparatus of the present invention, adequate foam control was obtained by the use of only 7.1 milliliters of the antifoaming agent which was supplied to a cotton wick foam applicator as described herein only twenty times. The importance of this is seen additionally from the fact that the particular antifoaming agent used, while very effective, was considered toxic to the Nocardia microorganism that was used in the fermentation.

Many chemical defoaming agents are known which may be used in connection with the practice of the present invention. These include animal and/or vegetable oils and esters, higher alcohols, fatty acids and esters, silicones and a variety of products derived from petroleum. One of the most popular antifoaming agents comprises octadecanol dissolved in lard oil. The invention, of course, is not limited to the use of any particular antifoaming agent. Neither is the invention restricted to control of foam over any particular liquid.

We claim:

1. Apparatus for the control of foam over foam-producing liquid which comprises a vessel adapted to hold a foam-producing liquid, a liquid absorptive defoaming element adapted to hold a quantity of an antifoam agent and to diffuse said antifoam agent into said foam only upon contact of said foam with said element, said element being suspended a short distance over said liquid in such manner as to make contact at the lower portion thereof with foam as it forms and rises to the level of the lower portion of said element and means to supply additional antifoam agent to said element.

2. Apparatus for the control of foam over foam-producing liquid which comprises a vessel adapted to hold a foam-producing liquid, a liquid absorptive defoaming element adapted to hold a quantity of an antifoam agent and to diffuse said antifoam agent into said foam only upon contact of said foam with said element, said element being suspended a short distance over said liquid in such manner as to make contact at the lower portion thereof with foam as it forms and rises to the level of the lower portion of said element, foam alarm means suspended over said liquid and adapted to indicate the presence of foam at a predetermined height about the lower portion of said element and means responsive to said foam alarm means to supply additional antifoam agent to said element.

3. An antifoam dispensing device for use in a tank containing liquid having foaming propensities comprising a liquid absorptive defoaming element positioned within said tank above the surface of said liquid in a zone provided for the foaming thereof, a reservoir of anti-foam agent, a conduit communicating with said reservoir and said element, means associated with said reservoir and said conduit operable to supply said agent to said element, said element being adapted to diffuse said defoaming agent into said foam only upon contact of said foam with said element, and means responsive to the rise of foam in said zone to a predetermined elevation effective to operate said supply means to supply said agent through said conduit to said defoaming element.

4. A method for controlling foam upon a liquid having foaming propensities which comprises positioning above the surface of said liquid in a zone provided for the foaming thereof a liquid absorptive defoaming element and means responsive to the rise of foam in said zone to a predetermined elevation effective to operate supply means associated with a reservoir of antifoam agent and a conduit communicating with said reservoir and said element operable to supply said agent to said element, said element being adapted to diffuse said agent into said foam only upon contact of said foam with said element, actuating said foam responsive means by said foam causing the operation of said supply means to supply said agent through said conduit to said element, and diffusing said agent into said foam.

References Cited in the file of this patent

UNITED STATES PATENTS

| | | |
|---|---|---|
| 1,792,963 | Boye | Feb. 17, 1931 |
| 1,916,614 | Harrison | July 4, 1933 |
| 1,984,789 | Everett | Dec. 18, 1934 |
| 2,017,368 | Magner | Oct. 15, 1935 |
| 2,649,758 | Cowgill | Aug. 25, 1953 |

FOREIGN PATENTS

| | | |
|---|---|---|
| 349,288 | Great Britain | May 28, 1931 |
| 655,885 | Great Britain | Aug. 8, 1951 |
| 448,846 | Germany | Aug. 25, 1927 |
| 98,961 | Sweden | Dec. 22, 1937 |
| 987,520 | France | Apr. 18, 1951 |